(12) United States Patent
Cho et al.

(10) Patent No.: US 11,127,010 B2
(45) Date of Patent: Sep. 21, 2021

(54) ELECTRONIC DEVICE, CERTIFICATION AGENCY SERVER, AND PAYMENT SYSTEM

(71) Applicant: Samsung Electronics Co., Ltd., Suwon-si (KR)

(72) Inventors: Boo Hyun Cho, Yongin-si (KR); Moon Soo Chang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 915 days.

(21) Appl. No.: 15/209,183

(22) Filed: Jul. 13, 2016

(65) Prior Publication Data

US 2017/0017963 A1 Jan. 19, 2017

(30) Foreign Application Priority Data

Jul. 14, 2015 (KR) .................. 10-2015-0100116

(51) Int. Cl.
*G06Q 20/40* (2012.01)
*G06Q 20/36* (2012.01)
(Continued)

(52) U.S. Cl.
CPC ....... *G06Q 20/40145* (2013.01); *G06Q 20/02* (2013.01); *G06Q 20/325* (2013.01); *G06Q 20/3227* (2013.01); *G06Q 20/3229* (2013.01); *G06Q 20/3674* (2013.01); *G06Q 20/3829* (2013.01); *G06Q 2220/00* (2013.01)

(58) Field of Classification Search
CPC combination set(s) only.
See application file for complete search history.

(56) References Cited

U.S. PATENT DOCUMENTS 6,853,988 B1 2/2005 Dickinson et al.
8,108,318 B2 1/2012 Mardikar
(Continued)

FOREIGN PATENT DOCUMENTS

CN 101165734 A 4/2008
CN 102592239 A 7/2012
(Continued)

OTHER PUBLICATIONS

Chinese Office Action dated Feb. 3, 2019, issued in Chinese Patent Application No. 201610550814.1.
(Continued)

*Primary Examiner* — Chrystina E Zelaskiewicz
(74) *Attorney, Agent, or Firm* — Jefferson IP Law, LLP

(57) ABSTRACT

An electronic device is provided. The electronic device includes a communication module configured to communicate with an external device, a biometric authentication module configured to perform biometric authentication, and a processor. The processor is configured to obtain biometric information of a user of the electronic device if a payment request is received, perform biometric authentication using the biometric information, send information associated with the biometric authentication to a first server located outside the electronic device, receive a session key, corresponding to the biometric authentication, from a second server located outside the electronic device, and send the session key and a payment token request to a third server located outside the electronic device.

12 Claims, 12 Drawing Sheets

(51) Int. Cl.
  *G06Q 20/32* (2012.01)
  *G06Q 20/38* (2012.01)
  *G06Q 20/02* (2012.01)

(56) References Cited

U.S. PATENT DOCUMENTS

| | | | |
|---|---|---|---|
| 8,150,772 | B2 | 4/2012 | Mardikar et al. |
| 8,417,643 | B2 | 4/2013 | Mardikar |
| 8,554,689 | B2 | 10/2013 | Mardikar et al. |
| 9,037,851 | B2 | 5/2015 | Choi |
| 9,282,898 | B2 | 3/2016 | McRoberts et al. |
| 9,852,418 | B2 | 12/2017 | Mardikar |
| 9,858,566 | B2 | 1/2018 | Mardikar et al. |
| 10,657,531 | B1* | 5/2020 | Arumugam ...... G06Q 20/40145 |
| 2005/0102244 | A1 | 5/2005 | Dickinson et al. |
| 2006/0235796 | A1 | 10/2006 | Johnson et al. |
| 2009/0307139 | A1 | 12/2009 | Mardikar et al. |
| 2009/0307140 | A1 | 12/2009 | Mardikar |
| 2009/0307142 | A1 | 12/2009 | Mardikar |
| 2009/0307778 | A1 | 12/2009 | Mardikar |
| 2010/0104101 | A1 | 4/2010 | Dickinson et al. |
| 2012/0054046 | A1* | 3/2012 | Albisu ................ G06Q 20/20 705/16 |
| 2012/0089520 | A1 | 4/2012 | Mardikar |
| 2012/0173434 | A1 | 7/2012 | Mardikar et al. |
| 2012/0278614 | A1 | 11/2012 | Choi |
| 2013/0179346 | A1 | 7/2013 | Kumnick et al. |
| 2013/0198086 | A1 | 8/2013 | Mardikar |
| 2013/0262857 | A1* | 10/2013 | Neuman ................ H04L 63/18 713/155 |
| 2013/0262858 | A1 | 10/2013 | Neuman et al. |
| 2013/0263211 | A1 | 10/2013 | Neuman et al. |
| 2013/0268444 | A1* | 10/2013 | Namgoong ...... G06Q 20/40145 705/71 |
| 2013/0345530 | A1 | 12/2013 | McRoberts et al. |
| 2014/0229388 | A1 | 8/2014 | Pereira et al. |
| 2014/0351146 | A1 | 11/2014 | Johnson et al. |
| 2015/0046339 | A1 | 2/2015 | Wong et al. |
| 2015/0056957 | A1 | 2/2015 | Mardikar et al. |
| 2015/0161587 | A1 | 6/2015 | Khan et al. |
| 2015/0180869 | A1 | 6/2015 | Verma |
| 2015/0237031 | A1 | 8/2015 | Neuman et al. |
| 2015/0264050 | A1 | 9/2015 | Neuman et al. |
| 2016/0142396 | A1 | 5/2016 | McRoberts et al. |
| 2016/0294821 | A1 | 10/2016 | Neuman et al. |

FOREIGN PATENT DOCUMENTS

| | | |
|---|---|---|
| KR | 10-2006-0003716 A | 1/2006 |
| KR | 10-2007-0022405 A | 2/2007 |
| KR | 10-2008-0075956 A | 8/2008 |
| KR | 10-2011-0054352 A | 5/2011 |
| KR | 10-2014-0131838 A | 11/2014 |
| KR | 10-2015-0024716 A | 3/2015 |
| KR | 10-2015-0050298 A | 5/2015 |
| WO | 2013/102210 A1 | 7/2013 |

OTHER PUBLICATIONS

Anonymous: "Challenge-response authentication—Wikipedia, the free encyclopedia", Jun. 14, 2014, pp. 1-4, XP055263020, Retrieved from the Internet: URL:http://en.wikipedia.org/w/index.php?title=Challenge%E2%80%93response_authentication&oldid=612907158 [retrieved on Apr. 5, 2016].

European Summons to attend oral proceedings dated Jul. 24, 2019, issued in European Patent Application No. 16179568.7-1217.

Globalplatform, "GlobalPlatform 2009: Progression continues", Card Technology Today, Jan. 1, 2009, pp. 12-13, XP055574131, Retrieved from the Internet: URL: http://www.securitydocumentworld.com/creo_files/upload/article-files/GlobalPlatform_White_Paper_MobileID.pdf, [retrieved on Mar. 25, 2019].

Smart Card Alliance, "A Smart Card Alliance Mobile & NFC Council White Paper; Host Card Emulation (HCE) 101", Aug. 1, 2014, XP055171894, Retrieved from the Internet: URL: http://www.smartcardalliance.org/wp-content/uploads/HCE-101-WP-FINAL-081114-clean.pdf, [retrieved on Feb. 25, 2015], Section 4.4; p. 20.

Extended European Search Report dated Apr. 30, 2020, issued in European Patent Application No. 20165928.1-1213.

* cited by examiner

ELECTRONIC DEVICE, CERTIFICATION AGENCY SERVER, AND PAYMENT SYSTEM

CROSS-REFERENCE TO RELATED APPLICATION(S)

This application claims the benefit under 35 U.S.C. § 119(a) of a Korean patent application filed on Jul. 14, 2015 in the Korean Intellectual Property Office and assigned Serial number 10-2015-0100116, the entire disclosure of which is hereby incorporated by reference.

TECHNICAL FIELD

The present disclosure relates to payment methods using portable electronic devices.

BACKGROUND

Electronic devices are implemented in the form of a variety of devices such as smartphones which may carried by users or wearable devices which may be worn on part of their bodies. With the development of information technology (IT), these electronic devices have high functionality rapidly and provide a variety of functions to users. Electronic devices provide, multimedia services, for example, music services, video services, digital broadcasting service, or network-based communication services such as a call service, a wireless internet service, a short message service (SMS), and a multimedia messaging service (MIMS).

Recently, a so-called 'fin-tech' in which a finance scheme and the IT are combined has become more attractive. The 'fin-tech' evaluated as shift of financial paradigms is extended to offline financial services and financial platform construction services as well as online financial services of the related art.

Technologies for authenticating users using biometric information have been developed. To apply biometric authentication services to online payment systems of the related art, there is a need for newly constructing system structures and operations of various servers included in the payment systems.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide payment methods using portable electronic devices.

In accordance with an aspect of the present disclosure, an electronic device is provided. The electronic device includes a communication module configured to communicate with an external device, a biometric authentication module configured to perform biometric authentication, and a processor. The processor is configured to obtain biometric information of a user of the electronic device if a payment request is received, perform biometric authentication using the biometric information, send information associated with the biometric authentication to a first server located outside the electronic device, receive a session key, corresponding to the biometric authentication, from a second server located outside the electronic device, and send the session key and a payment token request to a third server located outside the electronic device.

In accordance with another aspect of the present disclosure, a server is provided. The server includes a communication module configured to communicate with an external device and a processor configured to send an authentication request, received from an electronic device, to an authentication server, generate a biometric authentication session key if an authentication result is received from the authentication server, send the biometric authentication session key to the electronic device, and verify a biometric authentication result using the biometric authentication session key if a biometric authentication verification request is received from a financial server.

In accordance with another aspect of the present disclosure, an operation method of an electronic device is provided. The method includes obtaining biometric information of a user of the electronic device if a payment request is received, performing biometric authentication, sending information associated with the biometric authentication to a first server located outside the electronic device, receiving a session key, corresponding to the biometric authentication, from a second server located outside the electronic device, and sending the session key and a payment token request to a third server located outside the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
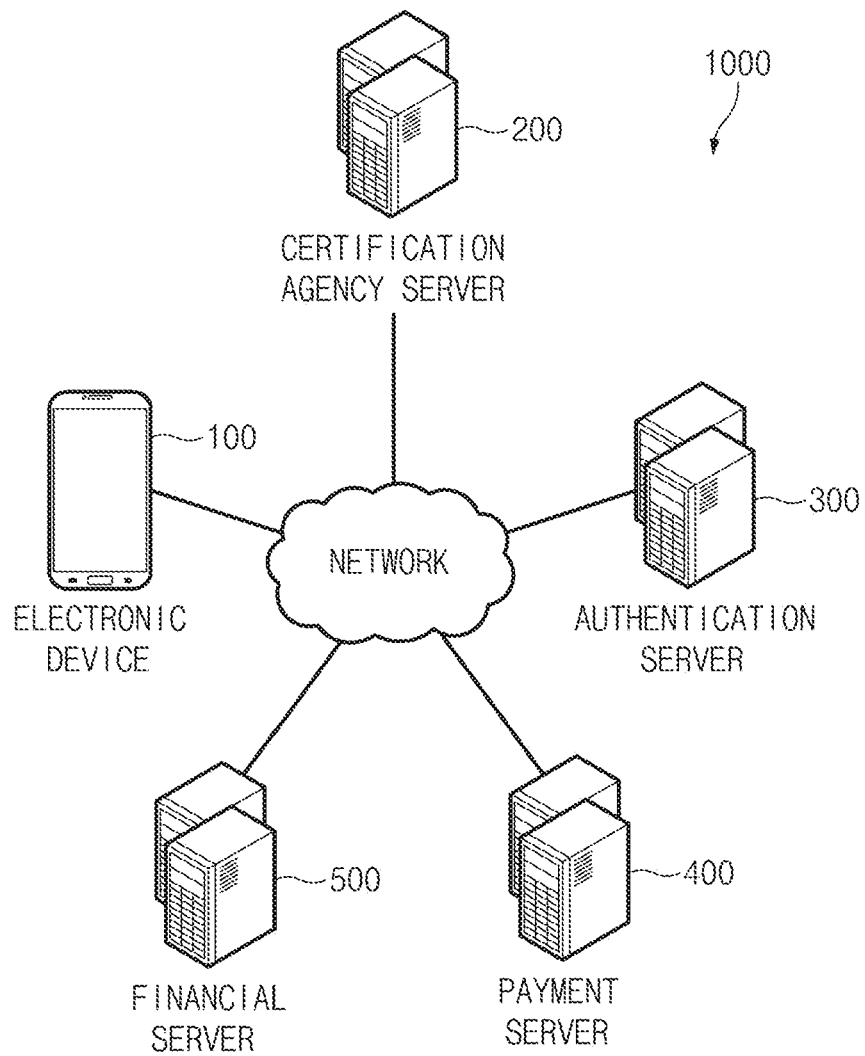
FIG. 1 is a drawing illustrating a configuration of a payment system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to". Instead, the expression "a device configured to" may mean that the device is "capable of" operating together with another device or other components. For example, a "processor configured to perform A, B, and C" may mean a generic-purpose processor (e.g., a central processing unit (CPU) or an application processor (AP)) which may perform corresponding operations by executing one or more software programs which stores a dedicated processor (e.g., an embedded processor) for performing a corresponding operation.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude various embodiments of the present disclosure.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group (MPEG-1 or MPEG-2) phase 1 or phase 2 audio layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

In various embodiments, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, electronic devices according to various embodiments will be described with reference to the accompanying drawings. The term "user" used herein may refer to a person who uses an electronic device or may refer to a device (e.g., an artificial electronic device) that uses an electronic device.

FIG. 1 is a drawing illustrating a configuration of a payment system according to various embodiments of the present disclosure.

Referring to FIG. 1, a payment system 1000 may include an electronic device 100, a certification agency server 200, an authentication server 300, a payment server 400 and a financial server 500. The components included in the payment system 1000 shown in FIG. 1 may connect with each other over a network. For one example, the electronic device 100, the certification agency server 200, the authentication server 300, the payment server 400, and the financial server 500 may connect with each other over a mobile communication network or an internet network.

The payment system 1000 according to various embodiments of the present disclosure may perform user authentication, requested in a payment information registration process, a payment information deletion process, or a payment process, through an external server and may determine whether the user authentication succeeds, using a session key generated based on the user authentication result.

The electronic device 100 may be a user device used by a user who wants to proceed with payment (or withdrawal) according to various embodiments of the present disclosure. The user may proceed with payment online/offline using the electronic device 100.

According to an embodiment, the electronic device 100 may provide a payment service using a payment application (e.g., a Samsung Pay application). According to an embodiment, the payment application may provide a user interface associated with payment. For example, the payment application may provide a user interface associated with card registration, payment, or transaction. Also, the payment application may provide, for example, a user interface associated with user authentication through identification and verification (ID & V).

According to an embodiment, the electronic device 100 may store card information (or account information) which interworks with a payment service account (e.g., a Samsung account), a biometric authentication service account, and a user account.

According to an embodiment, the electronic device 100 may perform user authentication through a biometric authentication process. If receiving a payment request from the user, the electronic device 100 may perform biometric authentication through the certification agency server 200 and the authentication server 300. According to an embodiment, if the biometric authentication is completed, the electronic device 100 may receive a biometric authentication session key from the certification agency server 200.

According to an embodiment, the electronic device 100 may send a payment token request to the payment server 400. According to an embodiment, the electronic device 100 may send a biometric authentication session key together with the payment token request to the payment server 400. According to an embodiment, the electronic device 100 may proceed with payment (or withdrawal) using the payment token issued from the financial server 500.

The certification agency server 200 may request the authentication server 300 to perform user authentication, based on a request of the electronic device 100. According to an embodiment, the certification agency server 200 may manage card information (or account information) which interworks with a payment service account (e.g., a Samsung account), a biometric authentication service account, and a user account.

According to an embodiment, if receiving an authentication result (or an authentication completion message) from the authentication server 300, the certification agency server 200 may generate a biometric authentication session key, and may store the generated biometric authentication session key or may send the generated biometric authentication session key to the electronic device 100. According to an embodiment, the biometric authentication session key may indicate that the authentication server 300 succeeds in performing the biometric authentication and may have a random value. According to an embodiment, the biometric authentication session key may have a specific expiration date. For example, the certification agency server 200 may delete the biometric authentication session key after storing the biometric authentication session key during the expiration date. According to an embodiment, the certification agency server 200 may change an expiration date set to the biometric authentication session key. For example, the certification agency server 200 may change the expiration date of the biometric authentication session key based on a policy of the payment system 1000.

According to an embodiment, if receiving a request to verify biometric authentication associated with payment information from the financial server 500, the certification agency server 200 may verify the biometric authentication using the biometric authentication session key. For example, the certification agency server 200 may receive a biometric authentication session key together with the biometric authentication verification request from the financial server 500. The certification agency server 200 may compare the stored biometric authentication session key with the biometric authentication session key received from the financial server 500 and may verify a biometric authentication result based on the compared result. For example, if the biometric authentication session keys are the same as each other, the certification agency server 200 may determine that the biometric authentication associated with the payment information is completed.

According to an embodiment, the authentication server 300 may perform user authentication based on a request of the electronic device 100. According to an embodiment, the authentication server 300 may provide a fast identify online (FIDO) authentication service for performing user authentication using biometric information of the user. According to an embodiment, the authentication server 300 may perform the user authentication using authentication information received from the electronic device 100. If completing the user authentication, the authentication server 300 may send the authenticated result to the certification agency server 200.

According to an embodiment, the payment server 400 may communicate information with the electronic device 100 and the financial server 500. According to an embodiment, the payment server 400 may manage the card information (or account information) which interworks with the payment service account (e.g., the Samsung account), the biometric authentication service account, and the user account.

According to an embodiment, if receiving a payment token request from the electronic device 100, the payment server 400 may send the received payment token request to the financial server 500. According to an embodiment, the payment server 400 may send the payment token request and a biometric authentication session key, received from the electronic device 100, to the financial server 500. According to an embodiment, the payment server 400 may send the payment token, received from the financial server 500, to the electronic device 100.

According to an embodiment, the financial server 500 may be a server operated by a card company or a bank. According to an embodiment, the financial server 500 may issue a card and may manage card information (or account information). According to an embodiment, the financial server 500 may finally determine whether to perform payment.

According to an embodiment, the financial server 500 may generate a payment token. According to an embodiment, if receiving a payment token request from the payment server 400, the financial server 500 may inquire about whether user authentication succeeds to the certification agency server 200. For example, the financial server 500 may send a biometric authentication session key received together with the payment token request to the certification agency server 200 to determine whether the user authentication succeeds. According to an embodiment, if receiving a biometric authentication result from the certification agency server 200, the financial server 500 may generate a payment token and may send the generated payment token to the electronic device 100 through the payment server 400. According to various embodiments of the present disclosure, the payment token may be generated by a token server independent of the financial server 500 and may be then sent to the electronic device 100.

Figure 2:
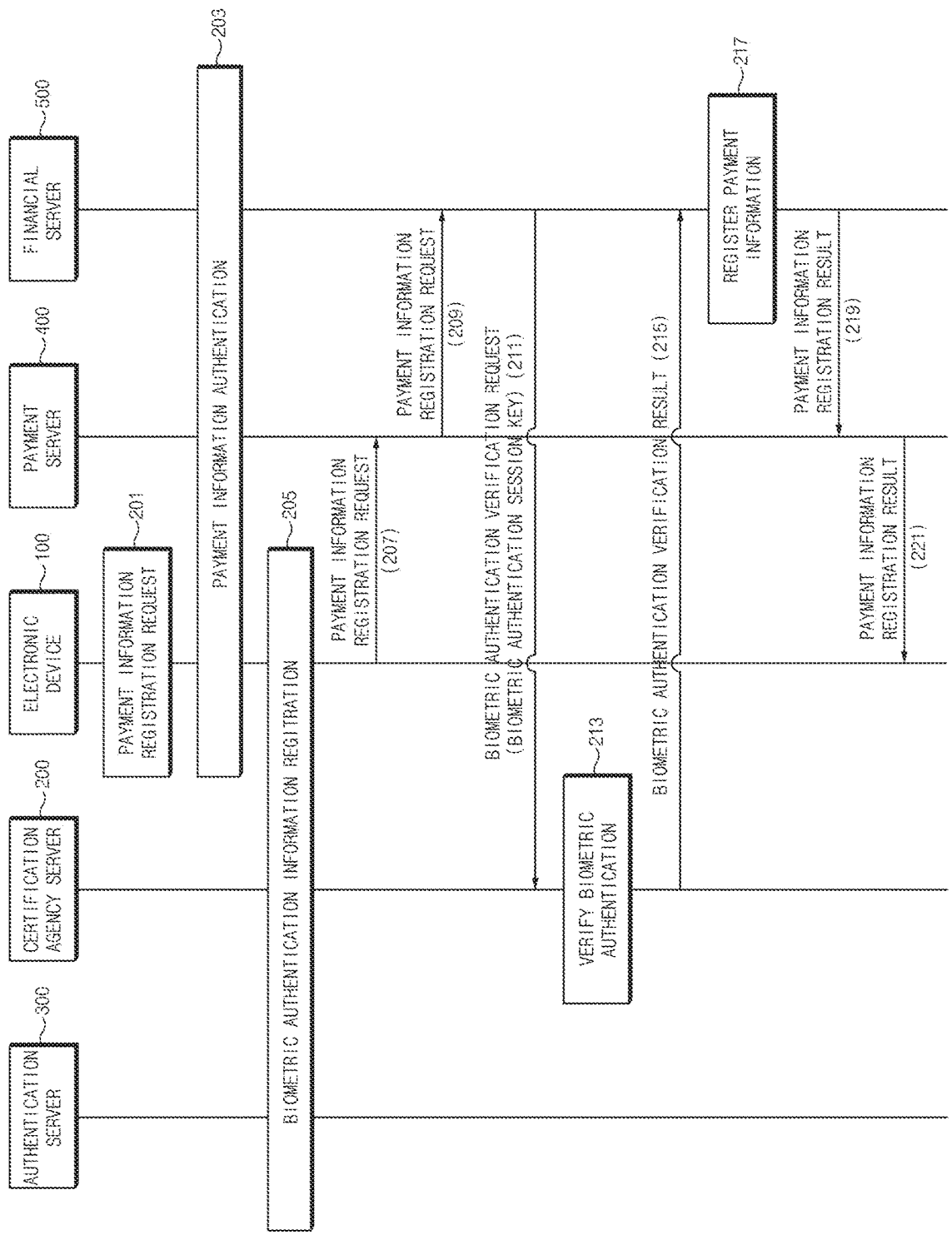
FIG. 2 is a signal sequence diagram illustrating a method for registering payment information in a payment system according to various embodiments of the present disclosure.

FIG. 2 is a signal sequence diagram illustrating a method for registering payment information in a payment system according to various embodiments of the present disclosure.

Referring to FIG. 2, in operation 201, an electronic device 100 may receive a request to register payment information. For example, the electronic device 100 may receive a command to register payment information from its user through a user interface provided from a payment application installed in the electronic device 100. The payment information may include, for example, a card number, a card expiration date, a card validation code (CVC), a phone number of the user, address of account information of the user, and the like.

In operation 203, the electronic device 100, a payment server 400, and the financial server 500 may perform a payment information authentication process. A description will be given in detail of the payment information authentication process with reference to FIG. 3. According to an embodiment, in the payment information authentication process, the financial server 500 may generate a payment information authentication session key and may send the generated payment information authentication session key to the electronic device 100.

In operation 205, the electronic device 100, a certification agency server 200, and an authentication server 300 may perform a biometric authentication information registration process. A description will be given in detail of the biometric authentication information registration process with reference to FIG. 4. According to an embodiment, in the biometric authentication information registration process, the certification agency server 200 may generate a biometric authentication session key and may send the generated biometric authentication session key to the electronic device 100.

In operation 207, the electronic device 100 may send the payment information registration request to the payment server 400. According to an embodiment, the electronic device 100 may send the payment information authentication session key and the biometric authentication session key together with the payment information registration request to the payment server 400.

In operation 209, the payment server 400 may send the payment information registration request to the financial server 500. According to an embodiment, the payment server 400 may send the payment information authentication session key and the biometric authentication session key together with the payment information registration request to the financial server 500.

In operation 211, the financial server 500 may send a biometric authentication verification request to the certification agency server 200. According to an embodiment, the financial server 500 may send the biometric authentication session key together with the biometric authentication verification request to the certification agency server 200. According to an embodiment, the financial server 500 may send encryption information, in which specific data is encrypted using a biometric authentication session key, together with the biometric authentication verification request to the certification agency server 200.

In operation 213, the certification agency server 200 may verify biometric authentication (or biometric authentication registration). According to an embodiment, the certification agency server 200 may compare a stored biometric authentication session key with the biometric authentication session key received from the financial server 500 and may verify a biometric authentication result based on the compared result. For example, if the biometric authentication session keys are the same as each other, the certification agency server 200 may determine that the biometric authentication associated with the payment information is completed. According to an embodiment, the certification agency server 200 may decrypt the encryption information sent together with the biometric authentication verification request using a stored biometric authentication session key and may verify a biometric authentication result based on the decrypted result. For example, if the encryption information is decrypted using the biometric authentication session key, the certification agency server 200 may determine that biometric authentication associated with the payment information is completed.

In operation 215, the certification agency server 200 may send a biometric authentication verification result to the financial server 500.

In operation 217, the financial server 500 may register the payment information requested in operation 209. According to an embodiment, the financial server 500 may determine whether the payment information is normally authenticated using the payment information authentication session key. If receiving the result of successively completing biometric authentication, the financial server 500 may register the payment information.

In operation 219, the financial server 500 may send a payment information registration result to the payment server 400. In operation 221, the payment server 400 may send the payment information registration result to the electronic device 100. If the registration of the payment information is successively completed, the user of the electronic device 100 may proceed with payment using the registered payment information.

Figure 3:
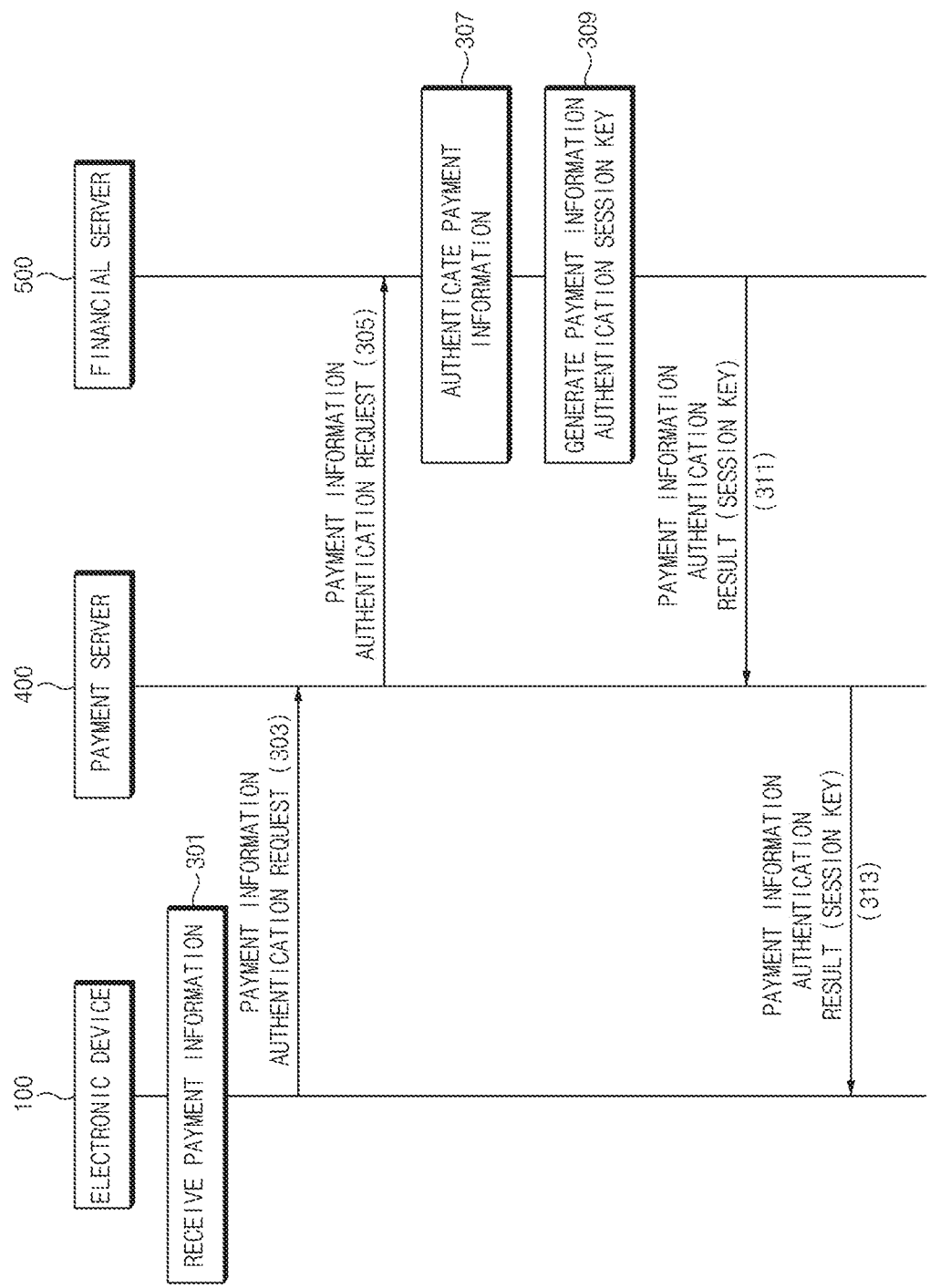
FIG. 3 is a signal sequence diagram illustrating a method for authenticating payment information in a payment system according to various embodiments of the present disclosure.

FIG. 3 is a signal sequence diagram illustrating a method for authenticating payment information in a payment system according to various embodiments of the present disclosure.

Referring to FIG. 3, in operation 301, an electronic device 100 may receive payment information from its user. For example, the electronic device 100 may receive the payment information from the user through a user interface provided from a payment application installed in the electronic device 100. The payment information may include, for example, a card number, a card expiration date, a CVC, a phone number of the user, address or account information of the user, and the like.

In operation 303, the electronic device 100 may send a payment information authentication request to a payment server 400. In operation 305, the payment server 400 may send the payment information authentication request to a financial server 500. According to an embodiment, the electronic device 100 may receive a resident registration number of the user together with the payment information. Alternatively, if receiving the payment information from the user, the electronic device 100 may perform user authentication using a short message service (SMS). According to an embodiment, the electronic device 100 may send the resident registration number of the user or an SMS authentication result together with the payment information authentication request to the payment server 400.

In operation 307, the financial server 500 may authenticate the payment information. For example, the financial server 500 may compare the payment information received from the payment server 400 with payment information of the user, stored in a database and may authenticate the payment information based on the compared result. According to an embodiment, if the resident registration number of the user or the SMS authentication result as well as the payment information is normal, the financial server 500 may succeed in authenticating the payment information.

In operation 309, the financial server 500 may generate a payment information authentication session key. The payment information authentication session key may indicate that the financial server 500 succeeds in authenticating the payment information and may have a random value. According to an embodiment, the payment information authentication session key may have a specific expiration date. For example, the financial server 500 may delete the payment information authentication session key after storing the payment information authentication session key during the expiration date. According to an embodiment, the financial server 500 may change an expiration date set to the payment information authentication session key. For example, the financial server 500 may change an expiration date of the payment information authentication session key based on a policy of a payment system 1000 of FIG. 1.

In operation 311, the financial server 500 may send a payment information authentication result to the payment server 400. According to an embodiment, the financial server 500 may send the payment information authentication session key together with the payment information authentication result to the payment server 400.

In operation 313, the payment server 400 may send the payment information authentication result to the electronic device 100. According to an embodiment, the payment server 400 may send the payment information authentication session key together with the payment information authentication result to the electronic device 100. As described with reference to FIG. 2, the payment information authentication session key may sent together with the payment information registration request from the electronic device 100 to the financial server 500 to be used to determine whether the payment information is normally authenticated.

Figure 4:
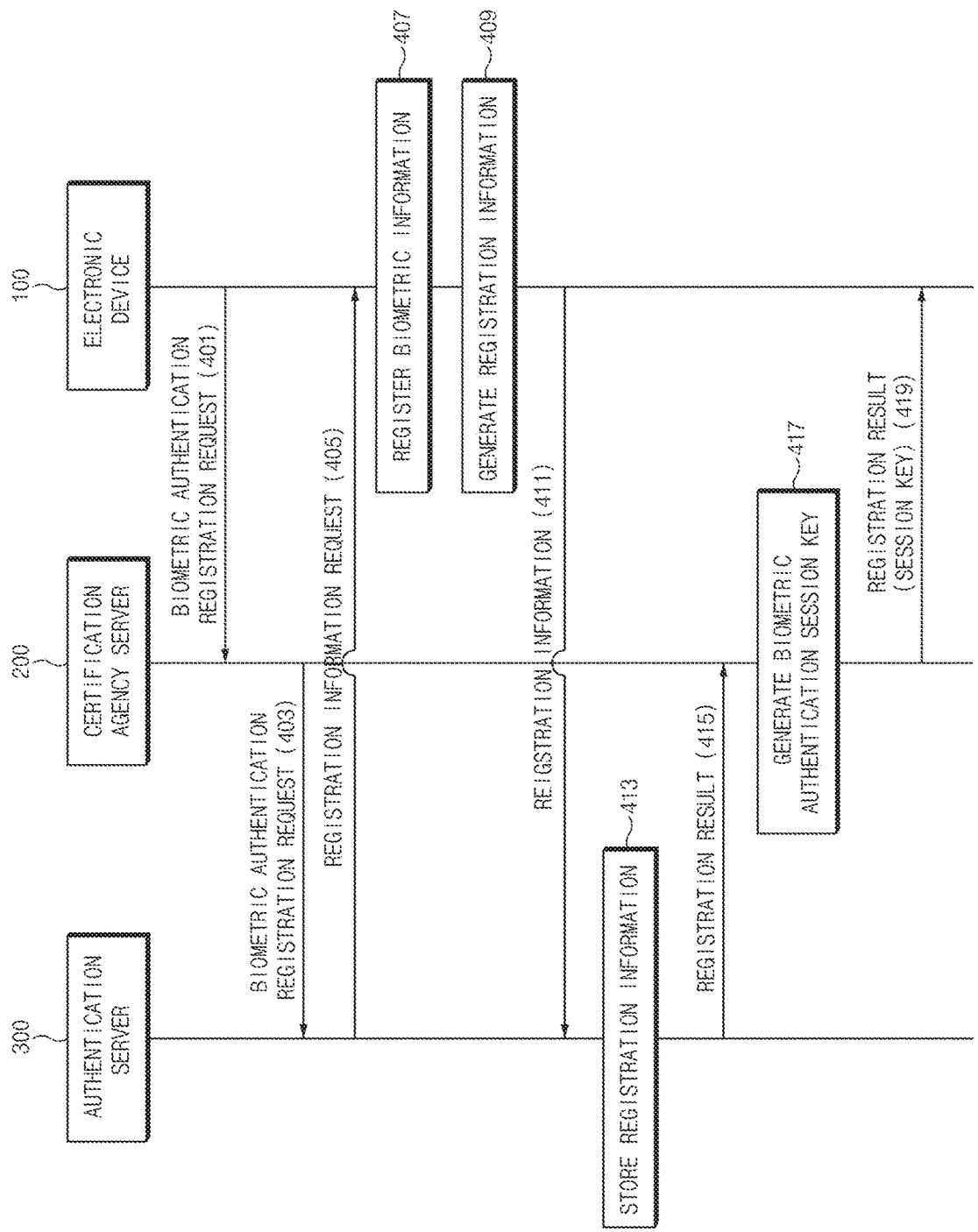
FIG. 4 is a signal sequence diagram illustrating a method for registering biometric authentication information in a payment system according to various embodiments of the present disclosure.

FIG. 4 is a signal sequence diagram illustrating a method for registering biometric authentication information in a payment system according to various embodiments of the present disclosure.

Referring to FIG. 4, in operation 401, an electronic device 100 may send a biometric authentication registration request to a certification agency server 200. In operation 403, the certification agency server 200 may send the biometric authentication registration request to an authentication server 300. According to an embodiment, the biometric authentication registration request may include a card company account (or a bank account), device identification information (e.g., an international mobile equipment identity (IMEI) of the electronic device 100), and a biometric authentication method. In operation 405, the authentication server 300 may send a registration information request to the electronic device 100 in response to the biometric authentication registration request.

In operation 407, the electronic device 100 may register biometric information. The biometric information may include, for example, fingerprint information, iris information, face information, or voice information. For example, the electronic device 100 may recognize biometric information of its user and may register the recognized biometric information as biometric information to be used to perform biometric authentication. According to an embodiment, the electronic device 100 may receive and register a personal identification number (PIN), which may be replaced with biometric information, from the user.

In operation 409, the electronic device 100 may generate registration information. According to an embodiment, the registration information may include a pair of asymmetric keys (e.g., a private key and a public key). According to an embodiment, the registration information may be generated in connection with the biometric information registered in operation 407. For example, in a payment process, the private key included in the registration information may be set to be accessible if biometric authentication using the biometric information registered in operation 407 is completed.

In operation 411, the electronic device 100 may send the registration information to the authentication server 300. According to an embodiment, the electronic device 100 may send the public key between the pair of asymmetric keys to the authentication server 300.

In operation 413, the authentication server 300 may store the registration information. In operation 415, the authentication server 300 may send the registered result to the certification agency server 200.

In operation 417, the certification agency server 200 may generate a biometric authentication session key. According to an embodiment, if the authentication server 300 succeeds in register the biometric information, the certification agency server 200 may generate the biometric authentication session key. In operation 419, the certification agency server 200 may send the registered result to the electronic device 100. According to an embodiment, the certification agency server 200 may send the biometric authentication session key together with the registered result to the electronic device 100.

According to an embodiment, if receiving the registered result from the authentication server 300, the certification agency server 200 may generate a biometric authentication identifier (or a biometric authentication service account) having a random value. According to an embodiment, the certification agency server 200 may generate a biometric authentication identifier for each card company (or for each bank). In other words, the certification agency server 200 may perform a biometric authentication registration process for each card company (or for each bank). According to an embodiment, if there is a biometric authentication identifier associated with a card company (or a bank) which proceeds with biometric authentication registration, the certification agency server 200 may omit the biometric authentication registration process.

Figure 5:
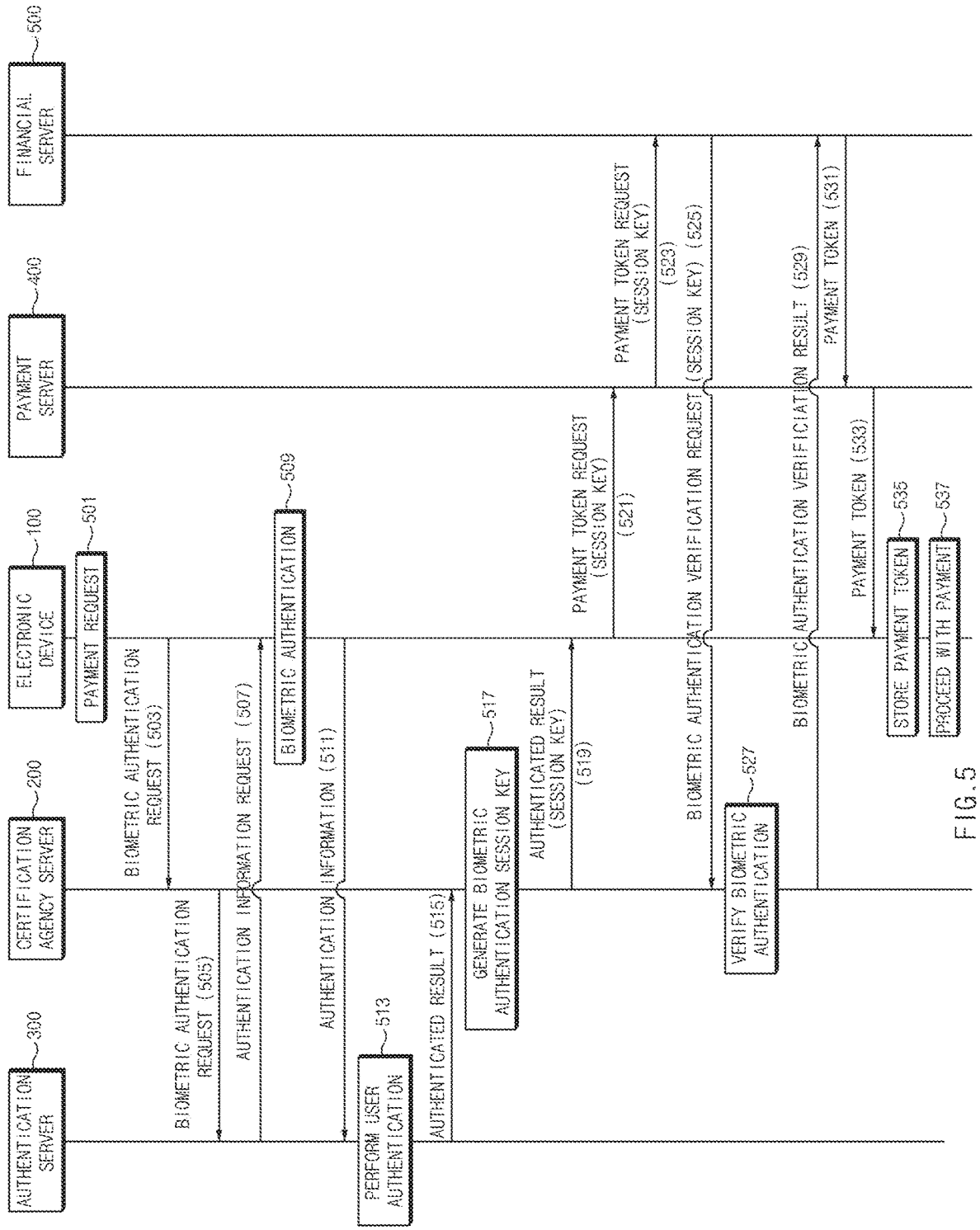
FIG. 5 is a signal sequence diagram illustrating a payment method of a payment system according to various embodiments of the present disclosure.

FIG. 5 is a signal sequence diagram illustrating a payment method of a payment system according to various embodiments of the present disclosure.

FIG. 5 illustrates operations in which the payment system proceeds with payment using a one time token (e.g., a one time card (OTC)) or in which the payment system first receives a repeatedly available token and proceeds with payment.

Referring to FIG. 5, in operation 501, an electronic device 100 may receive a payment request. For one example, the electronic device 100 may receive a payment command from its user through a user interface provided from a payment application installed in the electronic device 100. For another example, the electronic device 100 may receive a payment request from an external device.

In operation 503, the electronic device 100 may send a biometric authentication request to a certification agency server 200. In operation 505, the certification agency server 200 may send the biometric authentication request to the authentication server 300. According to an embodiment, the biometric authentication request may include a card company account (or a bank account) and a biometric authentication method. In operation 507, the authentication server 300 may send an authentication information request to the electronic device 100 in response to the biometric authentication request. According to an embodiment, the authentication information request may include a challenge value (or an authentication verification value) having a random value, a biometric authentication method (e.g., an iris authentication method or a face authentication method), and an authentication expiration date.

In operation 509, the electronic device 100 may perform biometric authentication. The biometric authentication may be authentication using biometric information of the user and may include, for example, fingerprint authentication, iris authentication, face authentication, or voice authentication, and the like. For example, the electronic device 100 may perform biometric authentication by recognizing biometric information of the user and comparing the recognized biometric information with previously registered biometric information.

In operation 511, the electronic device 100 may send authentication information associated with the biometric information to the authentication server 300. According to an embodiment, the authentication information may be information in which data including a challenge value is encrypted (or signed) using a private key between a pair of asymmetric keys (e.g., the private key and a public key) associated with the biometric authentication. According to an embodiment, if completing the biometric authentication, the electronic device 100 may access the private key.

In operation 513, the authentication server 300 may perform user authentication using the authentication information. For example, the authentication server 300 may perform the user authentication by decrypting a challenge value, encrypted using the private key, using the public key and comparing the decrypted challenge value with a challenge value stored in the authentication server 300.

In operation 515, the authentication server 300 may send the authenticated result to the certification agency server 200. In operation 517, the certification agency server 200 may generate a biometric authentication session key. According to an embodiment, if the authentication server 300 succeeds in performing authentication, the certification agency server 200 may generate and store the biometric authentication session key.

In operation 519, the certification agency server 200 may send the authenticated result to the electronic device 100. According to an embodiment, the certification agency server 200 may send the biometric authentication session key together with the authenticated result to the electronic device 100.

In operation 521, the electronic device 100 may send a payment token request to a payment server 400. According to an embodiment, the electronic device 100 may send the biometric authentication session key together with the payment token request to the payment server 400.

In operation 523, the payment server 400 may send the payment token request to a financial server 500. According to an embodiment, the payment server 400 may send the biometric authentication session key together with the payment token request to the financial server 500.

In operation 525, the financial server 500 may send a biometric authentication verification request to the certification agency server 200. According to an embodiment, the financial server 500 may send the biometric authentication session key together with the biometric authentication verification request to the certification agency server 200. According to an embodiment, the financial server 500 may send encryption information, in which specific data is encrypted using the biometric authentication session key, together with the biometric authentication verification request to the certification agency server 200.

In operation 527, the certification agency server 200 may verify biometric authentication. According to an embodiment, the certification agency server 200 may compare the biometric authentication session key generated in operation 517 with the biometric authentication session key received from the financial server 500 and may verify a biometric authentication result based on the compared result. For example, if the biometric authentication session keys are the same as each other, the certification agency server 200 may determine that biometric authentication associated with payment information is completed. According to an embodiment, the certification agency server 200 may decrypt the encryption information, sent together with the biometric authentication verification request, using the biometric authentication session key generated in operation 517 and may verify a biometric authentication result based on the decrypted result. For example, if encryption information is decrypted using the biometric authentication session key, the certification agency server 200 may determine that biometric authentication associated with payment information is completed.

In operation 529, the certification agency server 200 may send a biometric authentication verification result to the financial server 500.

If determining that the biometric authentication is successfully completed, in operation 531, the financial server 500 may send a payment token to the payment server 400. In operation 533, the payment server 400 may send the payment token to the electronic device 100.

In operation 535, the electronic device 100 may store the payment token. According to an embodiment, the electronic device 100 may store the payment token in a memory with higher security. For example, the electronic device 100 may store the payment token in an embedded secure element (eSE), an embedded subscriber identity module (eSIM), or a trusted execution environment (TEE) region. The TEE region may be a memory included in a processor (or an AP) of the electronic device 100 and may correspond to a memory area which is accessible by the processor when the processor operates in a security mode.

According to an embodiment, the payment token may include a token which may be used one time for a payment request and a token which may be stored in the electronic device and may be used continuously (or repeatedly). According to an embodiment, if receiving a one time token, the electronic device 100 may omit the process of storing the payment token.

In operation 537, the electronic device 100 may proceed with payment using the payment token. For example, the electronic device 100 may send token information to a payment device (e.g., a POS terminal) or a deposit and withdrawal device (e.g., an ATM device) using near field communication (NFC) or magnetic secure transmission (MST) communication technologies.

According to an embodiment, if the electronic device 100 stores a token which may be continuously used by the electronic device 100, operations 521 to 537 may be omitted. In other words, the electronic device 100 may omit a token issue process and may proceed with payment using the previously stored token after performing biometric authentication.

Figure 6:
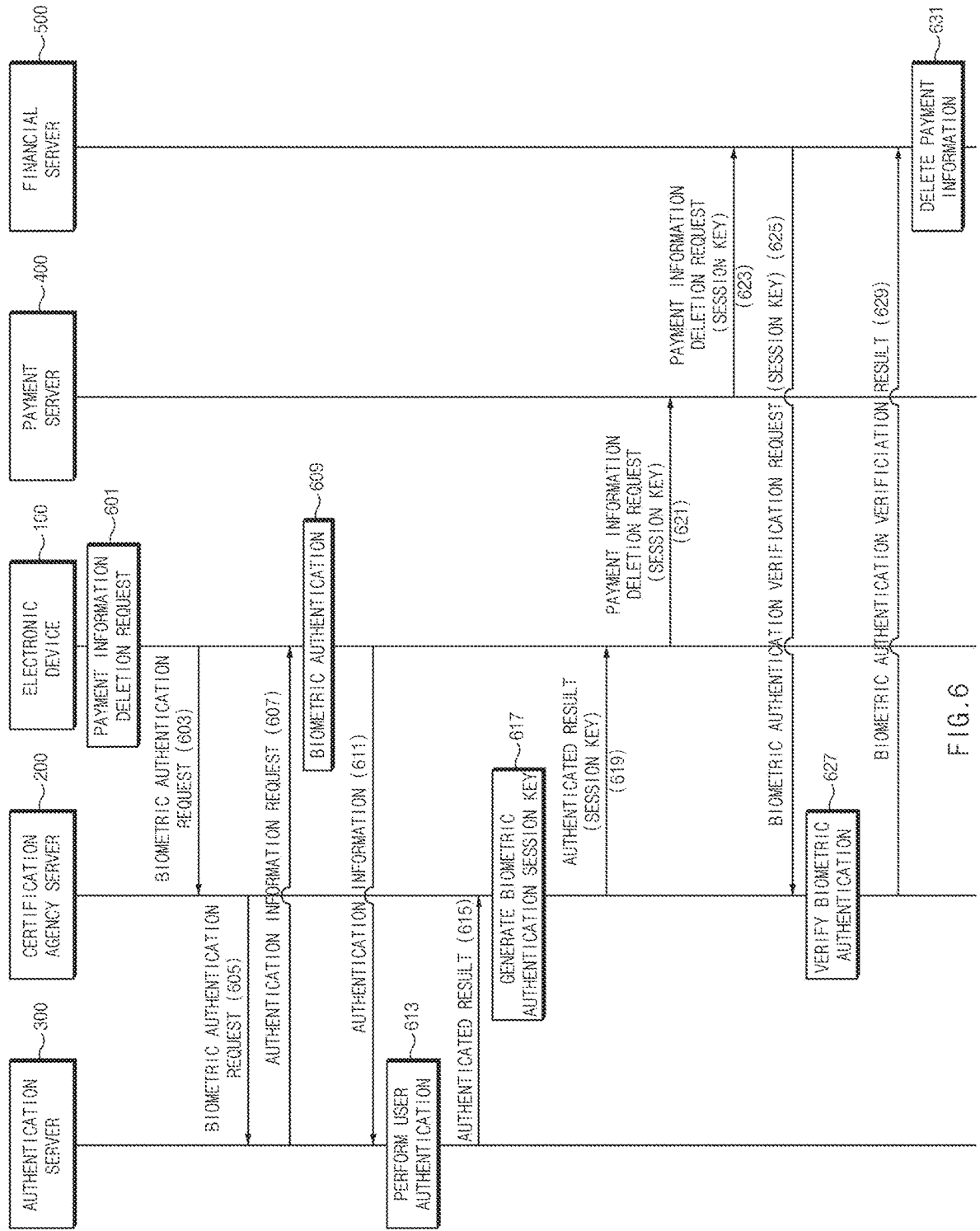
FIG. 6 is a signal sequence diagram illustrating a method for deleting an account in a payment system according to various embodiments of the present disclosure.

FIG. 6 is a signal sequence diagram illustrating a method for deleting an account in a payment system according to various embodiments of the present disclosure.

Referring to FIG. 6, in operation 601, an electronic device 100 may receive a request to delete payment information (e.g., registered card or account information). For example, the electronic device 100 may receive a command to delete payment information from its user through a user interface provided from a payment application installed in the electronic device 100.

In operation 603, the electronic device 100 may send a biometric authentication request to a certification agency server 200. In operation 605, the certification agency server 200 may send the biometric authentication request to the authentication server 300. According to an embodiment, the biometric authentication request may include a card company account (or a bank account) and a biometric authentication method. In operation 607, the authentication server 300 may send an authentication information request to the electronic device 100 in response to the biometric authentication request. According to an embodiment, the authentication information request may include a challenge value (or an authentication verification value) having a random value, a biometric authentication method (e.g., an iris authentication method or a face authentication method), and an authentication expiration date.

In operation 609, the electronic device 100 may perform biometric authentication. The biometric authentication may be authentication using biometric information of the user and may include, for example, fingerprint authentication, iris authentication, face authentication, or voice authentication, and the like. For example, the electronic device 100 may perform biometric authentication by recognizing biometric information of the user and comparing the recognized biometric information with previously registered biometric information.

In operation 611, the electronic device 100 may send authentication information associated with the biometric authentication to the authentication server 300. According to an embodiment, the authentication information may be information in which data including a challenge value is encrypted (or signed) using a private key between a pair of asymmetric keys (e.g., the private key and a public key) associated with the biometric authentication. According to an embodiment, if completing the biometric authentication, the electronic device 100 may access the private key.

In operation 613, the authentication server 300 may perform user authentication using the authentication information. For example, the authentication server 300 may perform the user authentication by decrypting a challenge value, encrypted using the private key, using the public key and comparing the decrypted challenge value with a challenge value stored in the authentication server 300.

In operation 615, the authentication server 300 may send the authenticated result to the certification agency server 200. In operation 617, the certification agency server 200 may generate a biometric authentication session key. According to an embodiment, if the authentication server 300 succeeds in performing authentication, the certification agency server 200 may generate and store the biometric authentication session key.

In operation 619, the certification agency server 200 may send the authenticated result to the electronic device 100. According to an embodiment, the certification agency server 200 may send the biometric authentication session key together with the authenticated result to the electronic device 100.

In operation 621, the electronic device 100 may send a payment information deletion request to the payment server 400. According to an embodiment, the electronic device 100 may send the biometric authentication session key together with the payment information deletion request to the payment server 400.

In operation 623, the payment server 400 may send the payment information deletion request to a financial server 500. According to an embodiment, the payment server 400 may send the biometric authentication session key together with the payment information deletion request to the financial server 500.

In operation 625, the financial server 500 may send a biometric authentication verification request to the certification agency server 200. According to an embodiment, the financial server 500 may send the biometric authentication session key together with the biometric authentication verification request to the certification agency server 200. According to an embodiment, the financial server 500 may send encryption information, in which specific data is encrypted using the biometric authentication session key, together with the biometric authentication verification request to the certification agency server 200.

In operation 627, the certification agency server 200 may verify biometric authentication. According to an embodiment, the certification agency server 200 may compare the biometric authentication session key generated in operation 617 with the biometric authentication session key received from the financial server 500 and may verify a biometric authentication result based on the compared result. For example, if the biometric authentication session keys are the same as each other, the certification agency server 200 may determine that the biometric authentication associated with the payment information is completed. According to an embodiment, the certification agency server 200 may decrypt the encryption information, sent together with the biometric authentication verification request, using the biometric authentication session key generated in operation 617 and may verify a biometric authentication result based on the decrypted result. For example, if encryption information is decrypted using the biometric authentication session key, the certification agency server 200 may determine that the biometric authentication associated with the payment information is completed.

In operation 629, the certification agency server 200 may send a biometric authentication verification result to the financial server 500.

If determining that the biometric authentication is successfully completed, in operation 631, the financial server 500 may delete the payment information requested by the user.

Figure 7:
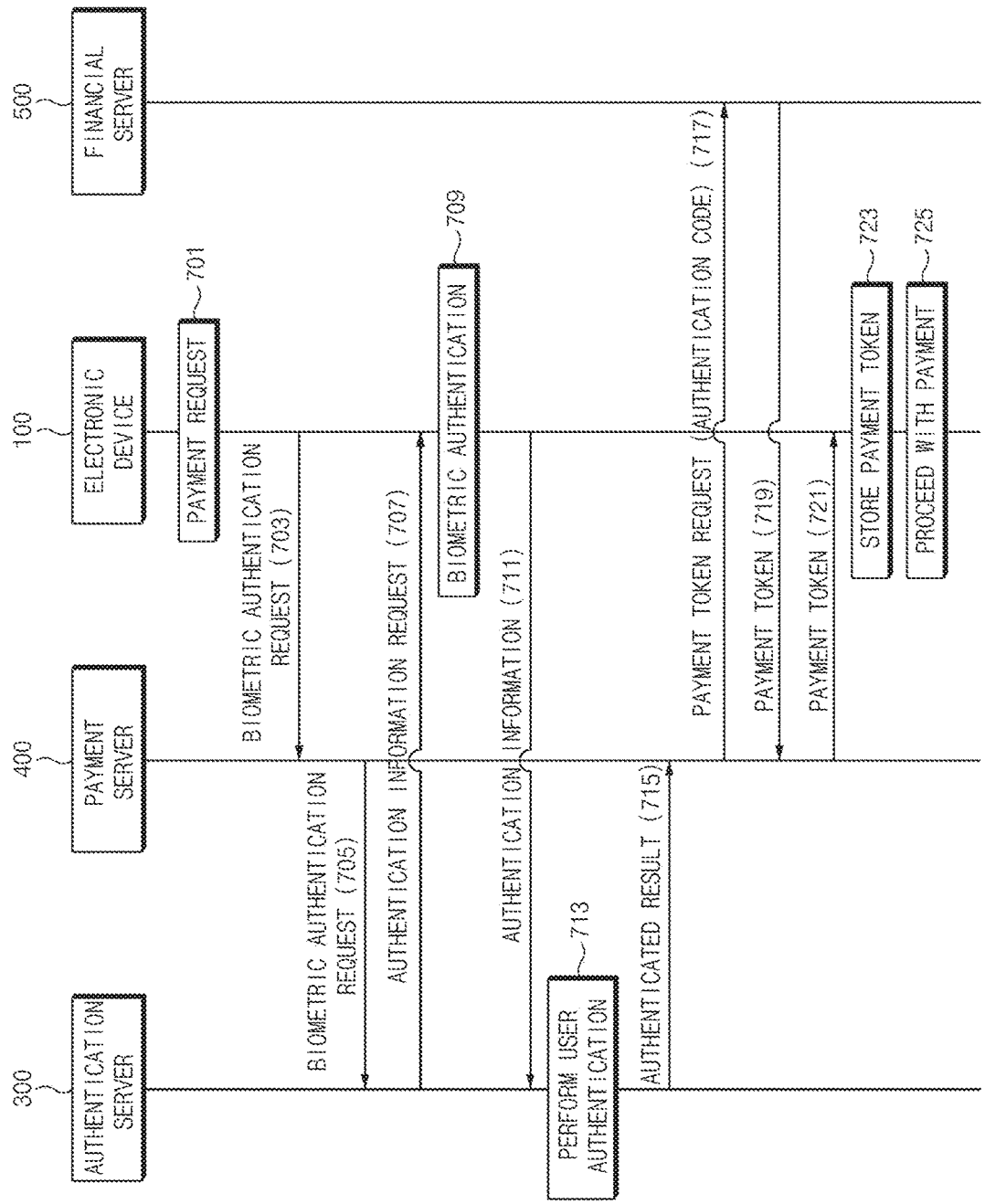
FIG. 7 is a signal sequence diagram illustrating a payment method of a payment system according to various embodiments of the present disclosure.

FIG. 7 is a signal sequence diagram illustrating a payment method of a payment system according to various embodiments of the present disclosure.

FIG. 7 illustrates operations in which the payment system proceeds with payment using a one time token (e.g., a OTC) or in which the payment system first receives a repeatedly available token and proceeds with payment.

According to an embodiment, a certification agency server 200 of FIG. 1 and a payment server 400 may be operated as one integrated server. In other words, an operation performed by the certification agency server 200 may be performed by the payment server 400. Hereinafter, a description will be given of a payment method of the payment system in which the certification agency server 200 and the payment server 400 are operated as one server and the payment server 400 plays a role of the certification agency server 200.

Referring to FIG. 7, in operation 701, an electronic device 100 may receive a payment request. For one example, the electronic device 100 may receive a payment command from its user through a user interface provided from a payment application installed in the electronic device 100. For another example, the electronic device 100 may receive a payment request from an external device.

In operation 703, the electronic device 100 may send a biometric authentication request to the payment server 400. In operation 705, the payment server 400 may send the biometric authentication request to the authentication server 300. According to an embodiment, the biometric authentication request may include a card company account (or a bank account) and a biometric authentication method. In operation 707, the authentication server 300 may send an authentication information request to the electronic device 100 in response to the biometric authentication request. According to an embodiment, the authentication information request may include a challenge value (or an authentication verification value) having a random value, a biometric authentication method (e.g., an iris authentication method or a face authentication method), and an authentication expiration date.

In operation 709, the electronic device 100 may perform biometric authentication. The biometric authentication may be authentication using biometric information of the user and may include, for example, fingerprint authentication, iris authentication, face authentication, or voice authentication, and the like. For example, the electronic device 100 may perform the biometric authentication by recognizing biometric information of the user and comparing the recognized biometric information with previously registered biometric information.

In operation 711, the electronic device 100 may send authentication information associated with the biometric information to the authentication server 300. According to an embodiment, the authentication information may be information in which data including a challenge value is encrypted (or signed) using a private key between a pair of asymmetric keys (e.g., the private key and a public key) associated with the biometric authentication. According to an embodiment, if completing the biometric authentication, the electronic device 100 may access the private key.

In operation 713, the authentication server 300 may perform user authentication using the authentication information. For example, the authentication server 300 may perform the user authentication by decrypting a challenge value, encrypted using the private key, using the public key and comparing the decrypted challenge value with a challenge value stored in the authentication server 300.

In operation 715, the authentication server 300 may send the authenticated result to the certification agency server 200.

In operation 717, the payment server 400 may send a payment token request to the financial server 500. According to an embodiment, the payment request token may include a code indicating that biometric authentication is completed.

In operation 719, the financial server 500 may send the payment token to the payment server 400. According to an embodiment, if determining that the biometric authentication is successfully completed using the code included in the payment token request, the financial server 500 may send the payment token to the payment server 400. In operation 721, the payment server 400 may send the payment token to the electronic device 100.

In operation 723, the electronic device 100 may store the payment token. According to an embodiment, the electronic device 100 may store the payment token in a memory with higher security. For example, the electronic device 100 may store the payment token in an eSE, an eSIM, or a TEE region. The TEE region may be a memory included in a processor (or an AP) of the electronic device 100 and may correspond to a memory area which is accessible by the processor when the processor operates in a security mode.

According to an embodiment, the payment token may include a token which may be used one time for a payment request and a token which may be stored in the electronic device and may be used continuously (or repeatedly). According to an embodiment, if receiving a one time token, the electronic device 100 may omit the process of storing the payment token.

In operation 725, the electronic device 100 may proceed with payment using the payment token. For example, the electronic device 100 may send token information to a payment device (e.g., a POS terminal) or a deposit and withdrawal device (e.g., an ATM device) using NFC or MST communication technologies.

According to an embodiment, if the electronic device 100 stores a token which may be continuously used by the electronic device 100, operations 717 to 723 may be omitted. For example, if receiving the authenticated result from the authentication server 300, the payment server 400 may send the authenticated result to the electronic device 100. The electronic device 100 may omit a token issue process and may proceed with payment using the previously stored token.

Figure 8:
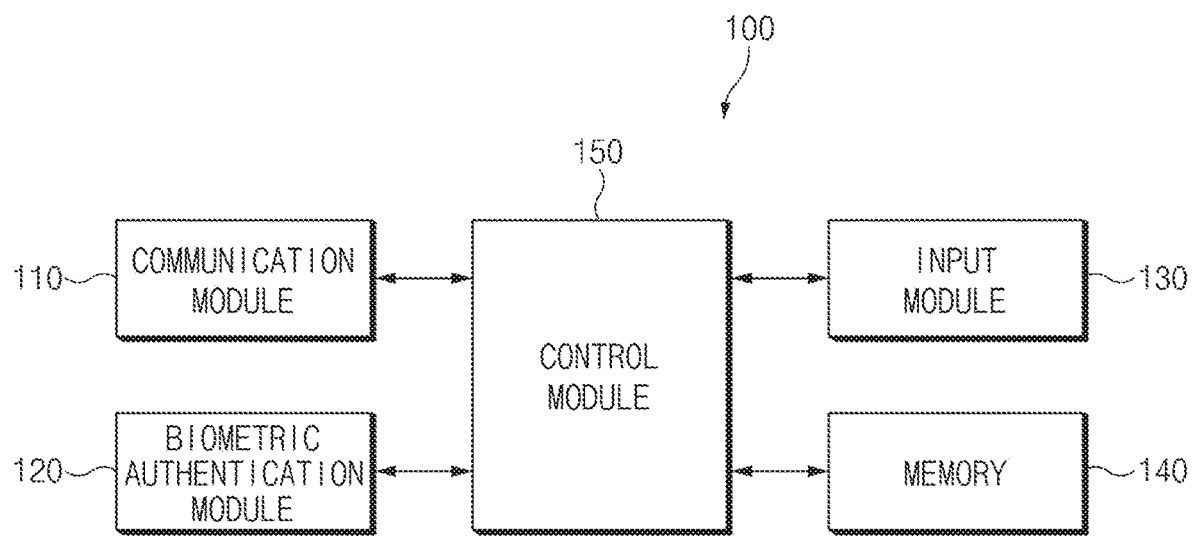
FIG. 8 is a block diagram illustrating a configuration of an electronic device according to various embodiments of the present disclosure.

FIG. 8 is a block diagram illustrating a configuration of an electronic device according to various embodiments of the present disclosure.

Referring to FIG. 8, an electronic device 100 may include a communication module 110, a biometric authentication module 120, an input module 130, a memory 140, and a control module 150.

The communication module 110 may communicate with an external device. According to an embodiment, the communication module 110 may communicate information, associated with payment, with the external device (e.g., a certification agency server 200 or a payment server 400, and the like of FIG. 1). According to an embodiment, the communication module 110 may communicate data over a network (e.g., a mobile communication network or an internet network). According to an embodiment, the communication module 110 may include a cellular module, a Wi-Fi module, a Bluetooth (BT) module, an NFC module, an MST module, a GNSS module, and the like.

The biometric authentication module 120 may recognize biometric information (e.g., fingerprint information, iris information, face information, voice information, and the like) of a user of the electronic device 100 and may perform user authentication using the biometric information. According to an embodiment, the biometric authentication module 120 may include a fingerprint authentication module, an iris authentication module, a face authentication module, and a voice authentication module.

The input module 130 may receive a user command. According to an embodiment, the input module 130 may include a touch sensor panel for sensing a touch operation of the user or a pen sensor panel for sensing a pen operation of the user. According to an embodiment, the input module 130 may detect a user operation, input within a specific distance, which is not in direct contact with a panel (e.g., the touch sensor panel or the pen sensor panel) as well as being in direct contact with the panel.

According to an embodiment, the input module 130 may receive a variety of user commands associated with payment from the user. For example, the input module 130 may receive a payment information registration command, an account deletion command, a payment command, and the like.

The memory 140 may store information associated with a payment service. According to an embodiment, the memory 140 may include an eSE, an eSIM, or a TEE region.

According to an embodiment, the memory 140 may store card information (or account information), which interworks with a payment service account (e.g., a Samsung account), a biometric authentication service account, and a user account, a card company account (or a bank account), a payment token, and the like. According to an embodiment, the memory 140 may store biometric information registered by the user and authentication information (e.g., an asymmetric key) associated with biometric authentication.

The control module 150 may control an overall operation of the electronic device 100. According to an embodiment, the control module 150 may control each of the communication module 110, the biometric authentication module 120, the input module 130, and the memory 140 to perform payment according to various embodiments of the present disclosure.

According to an embodiment, the control module 150 (e.g., an AP) may be implemented with a system on chip (SoC) including a processor (or a CPU), a graphics processing unit (GPU), a video processor, a memory, and the like.

According to an embodiment, if a payment request is received, the control module 150 may perform biometric authentication. For example, if the payment request is received, the control module 150 may send an authentication request including payment information to the certification agency server 200 through the communication module 110. If an authentication information request is received from an authentication server 300 of FIG. 1, the control module 150 may perform biometric authentication. For example, if the authentication information request is received, the control module 150 may activate a biometric authentication module corresponding to a biometric authentication method included in the authentication information request. According to an embodiment, the authentication information request may include a challenge value (or an authentication verification value) having a random value, a biometric authentication method (e.g., an iris authentication method or a face authentication method), and an authentication expiration date.

According to an embodiment, if completing the biometric authentication, the control module 150 may send authentication information to the certification agency server 200. According to an embodiment, the authentication information may be information in which data including a challenge value is encrypted (or signed) using a private key between a pair of asymmetric keys (e.g., the private key and a public key) associated with the biometric authentication. According to an embodiment, if completing the biometric authentication, the control module 150 may access the private key stored in the memory 140.

According to an embodiment, if a biometric authentication session key is received from the certification agency server 200, the control module 150 may send the biometric authentication session key and a payment token request to the payment server 400 through the communication module 110. According to an embodiment, the biometric authentication session key may have a specific expiration date.

According to an embodiment, if a payment token is received from the payment server 400, the control module 150 may proceed with payment using the payment token. For example, the control module 150 may send token information to a payment device (e.g., a POS terminal) or a deposit and withdrawal device (e.g., an ATM device) through an NFC module or an MST module.

According to an embodiment, if the payment token is received from the payment server 400, the control module 150 may store the payment token in the memory 140. According to an embodiment, if an authentication request for payment is received from the user, the control module 150 may determine whether a payment token corresponding to payment information is stored in the memory 140. According to an embodiment, if the payment token is stored in the memory 140, the control module 150 may proceed with payment using the payment token stored in the memory 140.

Figure 9:
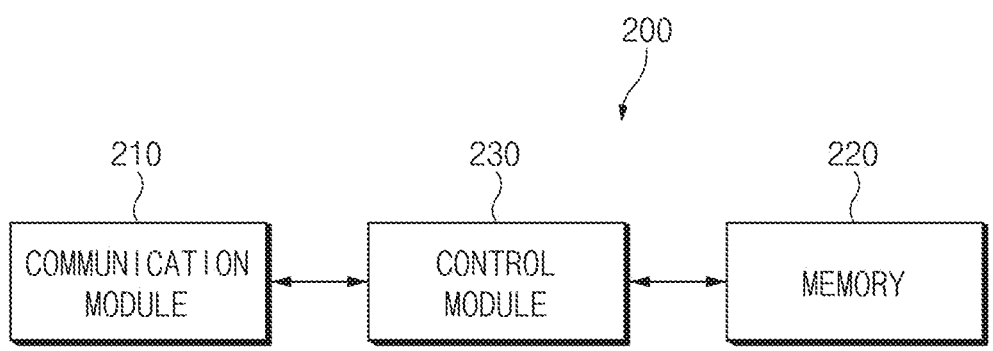
FIG. 9 is a block diagram illustrating a configuration of a certification agency server according to various embodiments of the present disclosure.

FIG. 9 is a block diagram illustrating a configuration of a certification agency server according to various embodiments of the present disclosure.

Referring to FIG. 9, a certification agency server 200 may include a communication module 210, a memory 220, and a control module 230.

The communication module 210 may communicate with an external device. According to an embodiment, the communication module 210 may communicate information, associated with user authentication, with the external device (e.g., an electronic device 100 or an authentication server 300 of FIG. 1). According to an embodiment, the communication module 210 may communicate data over a network (e.g., a mobile communication network or an internet network).

The memory 220 may store information associated with user authentication or payment. The memory 220 may store card information (or account information) which interworks with a payment service account (e.g., a Samsung account), a biometric authentication service account, and a user account, a card company account (or a bank account), a biometric authentication session key, and the like. According to an embodiment, the memory 220 may store information of users registered in a biometric authentication service in the form of a database.

The control module 230 may control an overall operation of the certification agency server 200. According to an embodiment, the control module 230 may request the authentication server 300 to perform biometric authentication registration based on a request of the electronic device 100 to perform user authentication.

According to an embodiment, the control module 230 may send a biometric authentication registration request, received from the electronic device 100, to the authentication server 300 through the communication module 210. According to an embodiment, the biometric authentication registration request may include a card company account (or a bank account), device identification information (e.g., an IMEI of the electronic device 100), and a biometric authentication method. According to an embodiment, the control module 230 may send a registration information request, received from the authentication server 300, to the electronic device 100 through the communication module 210.

The control module 230 may receive registration information generated based on biometric authentication from the electronic device and may send the received registration information to the authentication server 300 through the communication module 210. The registration information may be, for example, a public key between a pair of asymmetric keys generated based on the biometric authentication by the electronic device 100.

If receiving a registered result from the authentication server 300, the control module 230 may generate a biometric authentication session key. For example, if the authentication server 300 succeeds in registering biometric information, the control module 230 may generate the biometric authentication session key. The biometric authentication session key may indicate that the authentication server 300 succeeds in performing service registration and may have a random value. According to an embodiment, the control module 230 may send the biometric authentication session key together with the registered result to the electronic device 100 through the communication module 210.

According to an embodiment, if the registered result is received from the authentication server 300, the control module 230 may generate a biometric authentication identifier (or a biometric authentication service account) having a random value. According to an embodiment, the control module 230 may generate a biometric authentication identifier for each card company (or for each bank). In other words, the control module 230 may perform a biometric authentication registration process for each card company (or for each bank). According to an embodiment, if there is a biometric authentication identifier associated with a card company (or a bank) which proceeds with biometric authentication registration, the control module 230 may omit the biometric authentication registration process.

According to an embodiment, if an authentication request is received from the electronic device 100, the control module 230 may send the authentication request to the authentication server 300 through the communication module 210. According to an embodiment, the authentication request may include a card company account (or a bank account) and a biometric authentication method.

If an authenticated result is received from the authentication server 300, the control module 230 may generate a biometric authentication session key. For example, if the authentication server 300 succeeds in performing user authentication, the control module 230 may generate the biometric authentication session key. The biometric authentication session key may indicate that the authentication server 300 succeeds in performing the user authentication and may have a random value. According to an embodiment, the control module 230 may change an expiration date set to the biometric authentication session key. For example, the control module 230 may change an expiration date of the biometric authentication session key based on a policy of a payment system 1000 of FIG. 1. According to an embodiment, the control module 230 may send the biometric authentication session key together with the authenticated result to the electronic device 100 through the communication module 210.

According to an embodiment, if a biometric authentication verification request is received from a financial server 500 of FIG. 1, the control module 230 may verify biometric authentication using the biometric authentication session key. According to an embodiment, the control module 230 may compare the biometric authentication session key, generated based on the biometric information registration result or the biometric authentication result, with the biometric authentication session key received from the financial server 500 and may verify biometric authentication (or biometric authentication registration) based on the compared result. For example, if the biometric authentication session keys are the same as each other, the control module 230 may determine that the biometric authentication associated with payment information is normally performed. According to an embodiment, the control module 230 may decrypt encryption information, sent together with the biometric authentication verification request, using the generated biometric authentication session key and may verify the biometric authentication based on the decrypted result. For example, if decrypting the encryption information using the biometric authentication session key, the control module 230 may determine that the biometric authentication associated with the payment information is completed. According to an embodiment, the control module 230 may send a biometric authentication verification result to the financial server 500 through the communication module 210.

According to an embodiment, the certification agency server 200 and the payment server 400 may be operated as one integrated server. In other words, an operation performed by the certification agency server 200 may be performed by the payment server 400. If the certification agency server 200 and the payment server 400 may be operated as one server, the control module 230 may insert a code, indicating that authentication is successfully completed, into a biometric information registration result or a biometric authentication result and may send the biometric information registration result or the biometric authentication result to the electronic device 100, without generating the biometric authentication session key.

Figure 10:
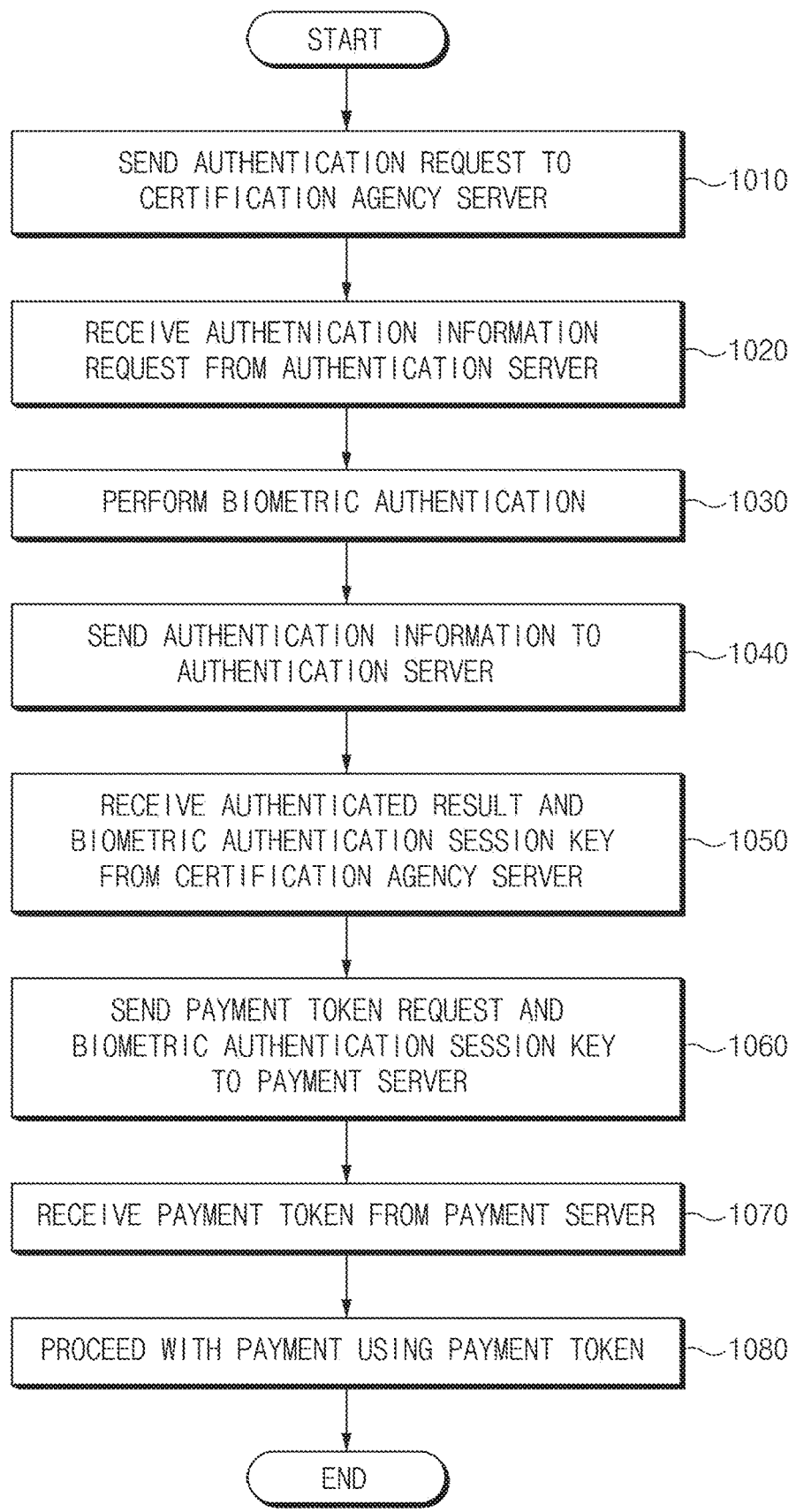
FIG. 10 is a flowchart illustrating a payment method of an electronic device according to various embodiments of the present disclosure.

FIG. 10 is a flowchart illustrating a payment method of an electronic device according to various embodiments of the present disclosure.

Referring to FIG. 10, operations may include operations processed by an electronic device 100 shown in FIGS. 1 to 8. Therefore, although there are contents omitted below, contents described about the electronic device 100 with reference to FIGS. 1 to 8 may be applied to the operations shown in FIG. 10.

Referring to FIG. 10, in operation 1010, the electronic device 100 may send a biometric authentication request to a certification agency server 200 of FIG. 1. For example, if receiving a payment request from a user of the electronic device 100, the electronic device 100 may send the biometric authentication request including payment information to the certification agency server 200.

In operation 1020, the electronic device 100 may receive an authentication information request from an authentication server 300 of FIG. 1. According to an embodiment, the authentication information request may include a challenge value (or an authentication verification value) having a random value, a biometric authentication method (e.g., an iris authentication method or a face authentication method), and an authentication expiration date.

In operation 1030, the electronic device 100 may perform biometric authentication. For example, if receiving the authentication information request, the electronic device 100 may activate a biometric authentication module corresponding to a biometric authentication method included in the authentication information request and may perform the biometric authentication.

In operation 1040, the electronic device 100 may send authentication information to the authentication server 300. According to an embodiment, the authentication information may be information in which information including a challenge value is encrypted (or signed) using a private key between a pair of asymmetric keys (e.g., the private key and a public key) associated with the biometric authentication.

In operation 1050, the electronic device 100 may receive an authenticated result and a biometric authentication session key from a certification agency server 200 of FIG. 1. According to an embodiment, the biometric authentication session key may have a specific expiration date.

In operation 1060, the electronic device 100 may send a payment token request and the biometric authentication session key to a payment server 400 of FIG. 1.

In operation 1070, the electronic device 100 may receive a payment token from the payment server 400.

In operation 1080, the electronic device 100 may proceed with payment using the payment token. For example, the electronic device 100 may send token information to a payment device (e.g., a POS terminal) or a deposit and withdrawal device (e.g., an ATM device) through an NFC module or an MST module.

Figure 11:
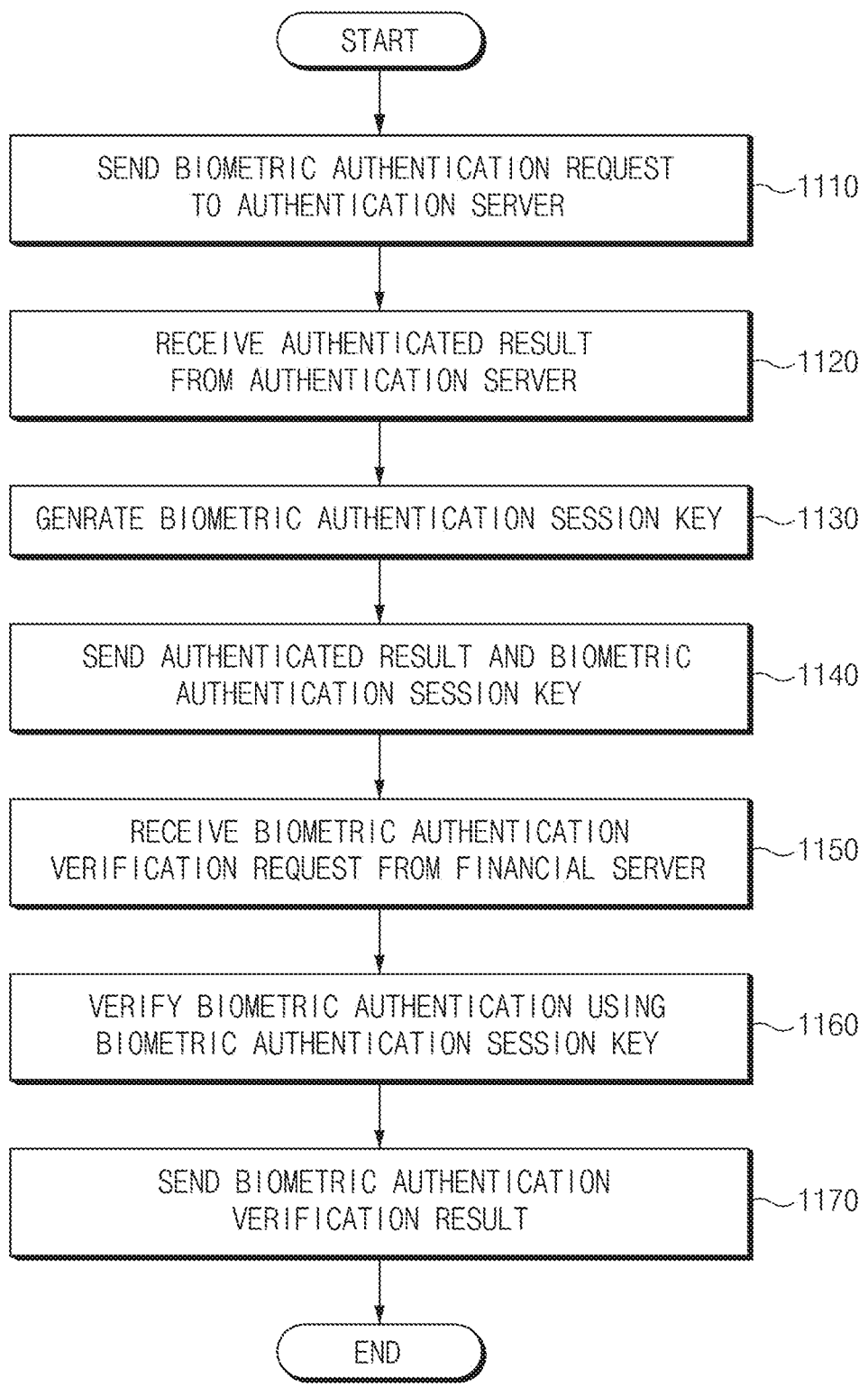
FIG. 11 is a flowchart illustrating an authentication method of a certification agency server according to various embodiments of the present disclosure.

FIG. 11 is a flowchart illustrating an authentication method of a certification agency server according to various embodiments of the present disclosure.

Referring to FIG. 11, in operation 1110, if receiving a biometric authentication request from an electronic device 100 of FIG. 1, a certification agency server 200 of FIG. 1 may send the biometric authentication request to an authentication server 300 of FIG. 1. According to an embodiment, the biometric authentication request may include a card company account (or a bank account), device identification information (e.g., an IMEI of the electronic device 100), and a biometric authentication method.

In operation 1120, the certification agency server 200 may receive an authenticated result from the authentication server 300.

In operation 1130, the certification agency server 200 may generate a biometric authentication session key. The biometric authentication session key may indicate that the authentication server 300 succeeds in performing user authentication and may have a random value. According to an embodiment, the certification agency server 200 may change an expiration date set to the biometric authentication session key. For example, the certification agency server 200 may change an expiration date of the biometric authentication session key based on a policy of a payment system 1000 of FIG. 1.

In operation 1140, the certification agency server 200 may send the authenticated result and the biometric authentication session key to the electronic device 100.

In operation 1150, the certification agency server 200 may receive a biometric authentication verification request from a financial server 500 of FIG. 1. According to an embodiment, the certification agency server 200 may receive a biometric authentication session key together with the biometric authentication verification request from the financial server 500.

In operation 1160, the certification agency server 200 may verify biometric authentication using the biometric authentication session key. According to an embodiment, the certification agency server 200 may compare the biometric authentication session key, generated based on the biometric authentication result, with the biometric authentication session key received from the financial server 500 and may verify the biometric authentication based on the compared result. According to an embodiment, the certification agency server 200 may decrypt encryption information, sent together with the biometric authentication verification request, using the biometric authentication session key and may verify the biometric authentication based on the decrypted result.

In operation 1170, the certification agency server 200 may send a biometric authentication verification result to the financial server 500.

Figure 12:
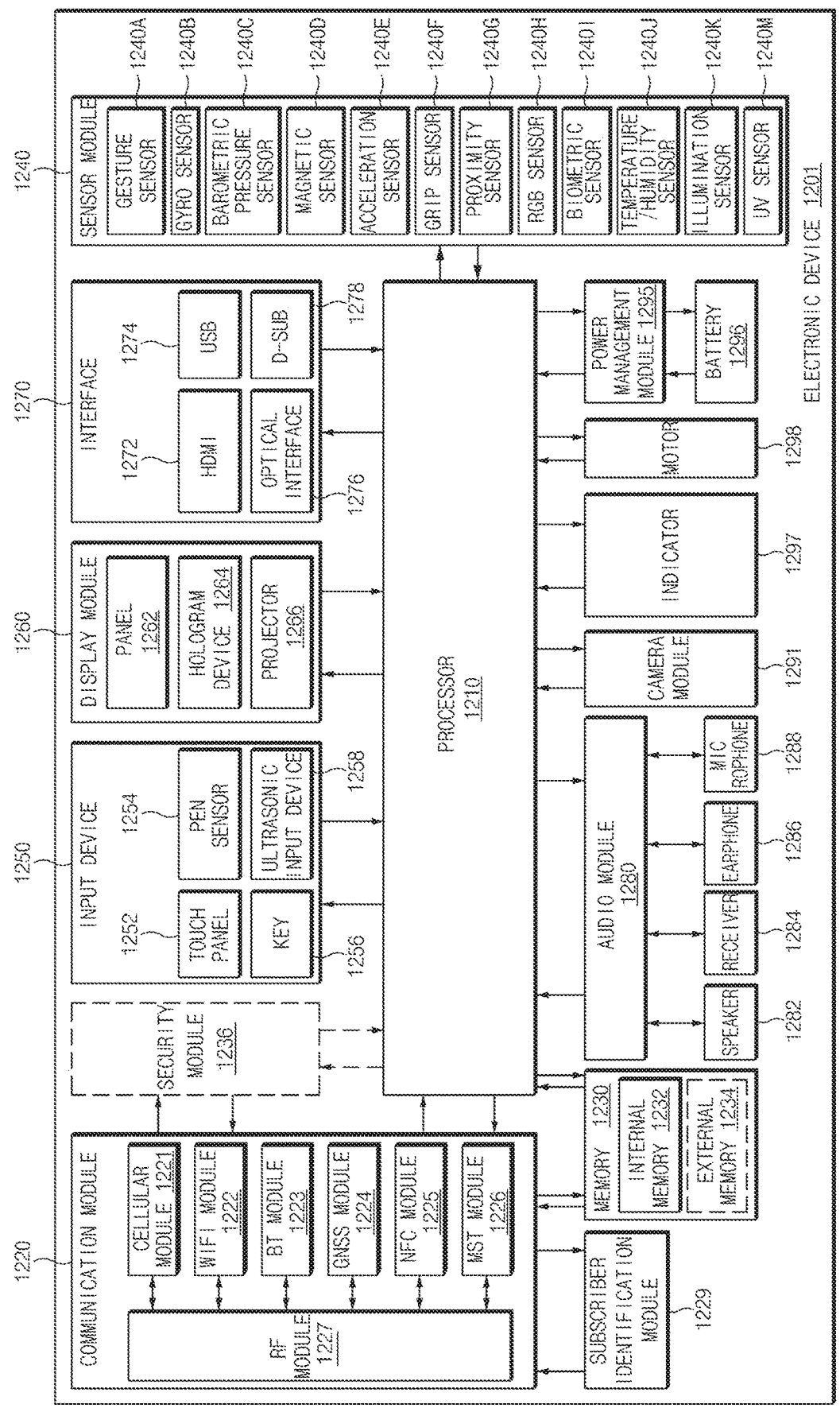
FIG. 12 is a block diagram illustrating a configuration of an electronic device according to various embodiments of the present disclosure.

FIG. 12 is a block diagram illustrating a configuration of an electronic device according to various embodiments of the present disclosure.

Referring to FIG. 12, the electronic device 1201 may include, for example, all or part of an electronic device 100 shown in FIG. 8. The electronic device 1201 may include one or more processors 1210 (e.g., APs), a communication module 1220, a SIM 1229, a memory 1230, a secure module 1236, a sensor module 1240, an input device 1250, a display 1260, an interface 1270, an audio module 1280, a camera module 1291, a power management module 1295, a battery 1296, an indicator 1297, and a motor 1298.

The processor 1210 may drive, for example, an operating system (OS) or an application program to control a plurality of hardware or software components connected thereto and may process and compute a variety of data. The processor 1210 may be implemented with, for example, a SoC. According to an embodiment, the processor 1210 may include a GPU (not shown) and/or an image signal processor (ISP) (not shown). The processor 1210 may include at least some (e.g., a cellular module 1221) of the components shown in FIG. 12. The processor 1210 may load a command or data received from at least one of other components (e.g., a non-volatile memory) into a volatile memory to process the data and may store various data in a non-volatile memory.

The communication module 1220 may have the same or similar configuration to a communication module 110 of FIG. 8. The communication module 1220 may include, for example, the cellular module 1221, a Wi-Fi module 1222, a BT module 1223, a GNSS module 1224 (e.g., a GPS module, a Glonass module, a Beidou module, or a Galileo module), a NFC module 1225, an MST module 1226, and a radio frequency (RF) module 1227.

The cellular module 1221 may provide, for example, a voice call service, a video call service, a text message service, or an Internet service, and the like through a communication network. According to an embodiment, the cellular module 1221 may identify and authenticate the electronic device 1201 in a communication network using the SIM 1229 (e.g., a SIM card). According to an embodiment, the cellular module 1221 may perform at least part of functions which may be provided by the processor 1210. According to an embodiment, the cellular module 1221 may include a communication processor (CP).

The Wi-Fi module 1222, the BT module 1223, the GNSS module 1224, the NFC module 1225, or the MST module 1226 may include, for example, a processor for processing data transmitted and received through the corresponding module. According to various embodiments, at least some (e.g., two or more) of the cellular module 1221, the Wi-Fi module 1222, the BT module 1223, the GNSS module 1224, the NFC module 1225, or the MST module 1226 may be included in one integrated chip (IC) or one IC package.

The RF module 1227 may transmit and receive, for example, a communication signal (e.g., an RF signal). Though not shown, the RF module 1227 may include, for example, a transceiver, a power amplifier module (PAM), a frequency filter, or a low noise amplifier (LNA), or an antenna, and the like. According to another embodiment, at least one of the cellular module 1221, the Wi-Fi module 1222, the BT module 1223, the GNSS module 1224, the NFC module 1225, or the MST module 1226 may transmit and receive an RF signal through a separate RF module.

The SIM 1229 may include, for example, a card which includes a SIM and/or an embedded SIM. The SIM 1229 may include unique identification information (e.g., an integrated circuit card identifier (ICCID)) or subscriber information (e.g., an international mobile subscriber identity (IMSI)).

The memory 1230 (e.g., a memory 140 of FIG. 8) may include, for example, an embedded memory 1232 or an external memory 1234. The embedded memory 1232 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1234 may include a flash drive, for example, a compact flash (CF), a secure digital (SD), a micro-SD, a mini-SD, an extreme digital (xD), a multimedia card (MMC), or a memory stick, and the like. The external memory 1234 may operatively and/or physically connect with the electronic device 1201 through various interfaces.

The secure module 1236 (or a secure memory) may be a module which has a relatively higher secure level than the memory 1230 and may be a circuit which stores secure data and guarantees a protected execution environment. The secure module 1236 may be implemented with a separate circuit and may include a separate processor. The secure module 1236 may include, for example, an embedded secure eSE which is present in a removable smart chip or a removable SD card or is embedded in a fixed chip of the electronic device 1201. Also, the secure module 1236 may be driven by an OS different from the OS of the electronic device 1201. For example, the secure module 1236 may operate based on a java card open platform (JCOP) OS.

The sensor module 1240 may measure, for example, a physical quantity or may detect an operation state of the electronic device 1201, and may convert the measured or detected information to an electric signal. The sensor module 1240 may include at least one of, for example, a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., red, green, blue (RGB) sensor), a biometric sensor 1240I, a temperature/humidity sensor 1240J, an illumination sensor 1240K, or an ultraviolet (UV) sensor 1240M. Additionally or alternatively, the sensor module 1240 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1240 may further include a control circuit for controlling at least one or more sensors included therein. According to various embodiments, the electronic device 1201 may further include a processor configured to control the sensor module 1240, as part of the processor 1210 or to be independent of the processor 1210. While the processor 1210 is in a sleep state, the electronic device 1201 may control the sensor module 1240.

The input device 1250 may include, for example, a touch panel 1252, a (digital) pen sensor 1254, a key 1256, or an ultrasonic input unit 1258. The touch panel 1252 may use at least one of, for example, a capacitive type, a resistive type, an infrared type, or an ultrasonic type. Also, the touch panel 1252 may include a control circuit. The touch panel 1252 may further include a tactile layer and may provide a tactile reaction to a user.

The (digital) pen sensor 1254 may be, for example, part of the touch panel 1252 or may include a separate sheet for recognition. The key 1256 may include, for example, a physical button, an optical key, or a keypad. The ultrasonic input unit 1258 may allow the electronic device 1201 to detect a sound wave using a microphone (e.g., a microphone 1288) and to verify data through an input tool generating an ultrasonic signal.

The display 1260 may include a panel 1262, a hologram device 1264, or a projector 1266. The panel 1262 may be implemented to be, for example, flexible, transparent, or wearable. The panel 1262 and the touch panel 1252 may be integrated into one module. The hologram device 1264 may show a stereoscopic image in a space using interference of light. The projector 1266 may project light onto a screen to display an image. The screen may be positioned, for example, inside or outside the electronic device 1201. According to an embodiment, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature 1278. The interface 1270 may be included in, for example, a communication module 110 shown in FIG. 8. Additionally or alternatively, the interface 1270 may include, for example, a mobile high definition link (MHL) interface, an SD card/MMC interface, or an infrared data association (IrDA) standard interface.

The audio module 1280 may convert a sound and an electric signal in dual directions. At least some of components of the audio module 1680 may be included in, for example, an input module 130 shown in FIG. 8. The audio module 1280 may process sound information input or output through, for example, a speaker 1282, a receiver 1284, an earphone 1286, or the microphone 1288, and the like.

The camera module 1291 may be a device which captures a still image and a moving image. According to an embodiment, the camera module 1291 may include one or more image sensors (not shown) (e.g., a front sensor or a rear sensor), a lens (not shown), an ISP (not shown), or a flash (not shown) (e.g., a light-emitting diode (LED) or a xenon lamp).

The power management module 1295 may manage, for example, power of the electronic device 1201. According to an embodiment, though not shown, the power management module 1295 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1296 and voltage, current, or temperature thereof while the battery 1296 is charged. The battery 1296 may include, for example, a rechargeable battery or a solar battery.

The indicator 1297 may display a specific state of the electronic device 1201 or part (e.g., the processor 1210) thereof, for example, a booting state, a message state, or a charging state, and the like. The motor 1298 may convert an electric signal into mechanical vibration and may generate vibration or a haptic effect, and the like. Though not shown, the electronic device 1201 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor (e.g., a control module 150 of FIG. 8 or a control module 230 of FIG. 9), one or more processors may perform functions corresponding to the instructions.

The computer-readable storage media may include a hard disc, a floppy disk, magnetic media (e.g., a magnetic tape), optical media (e.g., a compact disc ROM (CD-ROM) and a DVD), magneto-optical media (e.g., a floptical disk), a hardware device (e.g., a ROM, a RAM, or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to various embodiments, the electronic device may perform user authentication, requested in a payment information registration process, a payment information deletion process, or a payment process, through an external server and may determine whether the user authentication succeeds using a session key generated based on the user authentication result.

According to various embodiments, the electronic device may perform user authentication through an external server and may proceed with payment through various applications, included in the electronic device, based on the user authentication result.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device configured to improve transaction security, the electronic device comprising:
 a communication circuitry configured to communicate with an external device;
 a biometric authentication circuitry configured to perform biometric authentication; and
 a processor,
 wherein the processor executes instructions to:
 receive a payment request for a transaction,
 in response to the payment request, transmit a biometric authentication request to a certification agency server,
 receive an authentication information request from an authentication server in response to the biometric authentication request,
 obtain biometric information of a user of the electronic device when the authentication information request is received,
 perform biometric authentication using the biometric information,
 after the biometric authentication is completed, access a private key based on a result of the biometric authentication,
 obtain authentication information associated with the biometric authentication by encrypting or signing data including a challenge value using the private key,
 send the authentication information associated with the biometric authentication to the authentication server so that the authentication server decrypts the authentication information with a public key paired with the private key,
 receive a session key, corresponding to the biometric authentication, from the certification agency server, the session key being generated by the certification agency server based on receiving an authentication result from the authentication server,
 send the session key along with a payment token request to a payment server so that the payment server allows a financial server to check validity of the session key with the certification agency server,
 receive, from the payment server, a payment token issued by the financial server, and
 proceed with payment, via magnetic secure transmission (MST) communication technologies or near field communication technologies, using the payment token.

2. The electronic device of claim 1,
 wherein the authentication server is configured to perform user authentication using the authentication information associated with the biometric authentication.

3. The electronic device of claim 1, wherein the session key corresponding to the biometric authentication has an expiration date.

4. The electronic device of claim 1,
 wherein the authentication information request comprises an authentication verification value, a biometric authentication method, and an authentication expiration date, and
 wherein the authentication information associated with the biometric authentication comprises information in which the authentication verification value included in the authentication information request is encrypted.

5. The electronic device of claim 1, further comprising:
 a memory,
 wherein the processor further executes instructions to store the payment token in the memory when the payment token is received from the payment server.

6. The electronic device of claim 5, wherein the memory comprises at least one of an embedded secure element (eSE), an embedded subscriber identity module (eSIM), or a trusted execution environment (TEE) region.

7. The electronic device of claim 5, wherein the processor further executes instructions to:
 determine whether the payment token corresponding to payment information is stored in the memory when authentication for payment is requested from the user, and
 proceed with payment using the stored payment token when the payment token is stored.

8. An operation method configured to improve transaction security of an electronic device, the method comprising:
 receiving a payment request for a transaction,
 in response to the payment request, transmitting a biometric authentication request to a certification agency server,
 receiving an authentication information request from an authentication server in response to the biometric authentication request,
 obtaining biometric information of a user of the electronic device when the authentication information request is received;
 performing biometric authentication;
 after the biometric authentication is completed, accessing a private key based on a result of the biometric authentication;
 obtaining authentication information associated with the biometric authentication by encrypting or signing data including a challenge value using the private key;
 sending the authentication information associated with the biometric authentication to the authentication server so that the authentication server decrypts the authentication information with a public key paired with the private key;
 receiving a session key, corresponding to the biometric authentication, from the certification agency server, the session key being generated by the certification agency server based on receiving an authentication result from the authentication server;
 sending the session key along with a payment token request to a payment server so that the payment server allows a financial server to check validity of the session key with the certification agency server;
 receiving, from the payment server, a payment token issued by the financial server; and
 proceeding with payment, via magnetic secure transmission (MST) communication technologies or near field communication technologies, using the payment token.

9. The method of claim 8,
wherein the authentication server is configured to perform user authentication using the authentication information associated with the biometric authentication.

10. The method of claim 8, wherein the session key corresponding to the biometric authentication has an expiration date.

11. The method of claim 8,
wherein the authentication information request comprises an authentication verification value, a biometric authentication method, and an authentication expiration date, and
wherein the authentication information associated with the biometric authentication comprises information in which the authentication verification value included in the authentication information request is encrypted.

12. The method of claim 8, further comprising:
receiving the payment token from the payment server; and
storing the payment token in a memory of the electronic device.

\* \* \* \* \*